(12) United States Patent  
Burkhart et al.

(10) Patent No.: US 7,654,377 B2
(45) Date of Patent: Feb. 2, 2010

(54) HYDRAULIC ACTUATOR FOR A VEHICULAR POWER TRAIN

(75) Inventors: Robert O. Burkhart, Novi, MI (US); Gregory M. Pietron, Canton, MI (US); Yuji Fujii, Ann Arbor, MI (US); Ted D. Snyder, Brighton, MI (US); William E. Tobler, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 11/487,019

(22) Filed: Jul. 14, 2006

(65) Prior Publication Data

US 2008/0011577 A1    Jan. 17, 2008

(51) Int. Cl.
*F16D 25/12* (2006.01)

(52) U.S. Cl. ............... 192/85 R; 60/413; 417/413.2
(58) Field of Classification Search ............ 417/413.2
See application file for complete search history.

(56) References Cited

U.S. PATENT DOCUMENTS

| | | | |
|---|---|---|---|
| 3,703,228 A | 11/1972 | Chana | |
| 4,705,323 A | 11/1987 | Imoto et al. | |
| 4,738,493 A * | 4/1988 | Inagaki et al. ............ | 303/116.1 |
| 4,983,876 A | 1/1991 | Nakamura et al. | |
| 5,133,439 A | 7/1992 | Shellhause | |
| 5,505,287 A | 4/1996 | Asatsuke et al. | |
| 5,597,292 A * | 1/1997 | Rhee et al. ................ | 417/322 |
| 5,645,143 A | 7/1997 | Mohr et al. | |
| 5,944,159 A | 8/1999 | Schneider et al. | |
| 6,298,969 B1 | 10/2001 | Nagler et al. | |
| 6,623,256 B2 * | 9/2003 | Takagi et al. ............. | 417/413.2 |
| 6,889,811 B2 | 5/2005 | Ebert et al. | |
| 2005/0244288 A1 * | 11/2005 | O'Neill ................... | 417/413.2 |

FOREIGN PATENT DOCUMENTS

DE    4309901    9/1994

* cited by examiner

*Primary Examiner*—Richard M. Lorence
(74) *Attorney, Agent, or Firm*—David B. Kelley; MacMillan, Sobanski & Todd, LLC (57) ABSTRACT

An actuator system includes a piezoelectric pump; an accumulator including a cylinder, a piston located in the cylinder, a port located at a first side of the piston and hydraulically connected to the pump outlet and a switching circuit, a relief port hydraulically connected to the reservoir and located at a second side of the piston, and a spring biasing the piston toward the port; and a hydraulically actuated servo including a front port hydraulically connected to the switching circuit, a back port hydraulically connected to the reservoir, and the servo causing the friction element alternately to engage and to disengage in response to a magnitude of hydraulic pressure in the servo.

21 Claims, 5 Drawing Sheets

HYDRAULIC ACTUATOR FOR A VEHICULAR POWER TRAIN

BACKGROUND OF THE INVENTION

The preferred embodiment relates generally to an apparatus for actuating a friction element. More particularly it pertains to a piezoelectric actuator for use in an automatic transmission.

A conventional step-ratio automatic transmission system uses wet friction components, such as band brakes and plate clutches, for automatic shifting. Friction components couple, decouple or ground rotating gear elements to alter a torque path within gear sets, thereby achieving a desired level of torque multiplication between an engine and the driven wheels. When used as a part of a gasoline-electric hybrid powertrain, the transmission system may include a gear set that couples torque from the engine with that from an electrical machine.

A typical friction element is actuated hydraulically, requiring an engine-driven oil pump and a complex hydraulic pressure control system that typically includes a number of pressure and flow control valves. A powertrain control unit controls the engine and the hydraulic control system in a coordinated manner for automatic shifting. The engine-driven oil pump draws an appreciable amount of torque from the engine, lowering overall powertrain efficiency. Alternatively, friction components can be actuated mechanically or through other means. However, these means tend to be physically large in order to deliver torque capacity comparable to hydraulically-actuated systems.

New applications of automatic transmission technologies, such as a gasoline-electric hybrid powertrain, require small, packageable, highly efficient actuators as an alternative to conventional systems.

SUMMARY OF THE INVENTION

A self-contained hydraulic actuator system, which includes a piezoelectric pump and an accumulator, is suitable for vehicular powertrain applications and non-vehicular applications. The accumulator provides fluid flow to quickly stroke a hydraulic servo device while the pump accurately controls fluid pressure within the servo. The self-contained actuator system requires neither an engine-driven oil pump nor a conventional hydraulic control system. Thus, it entirely eliminates parasitic torque loss associated with the engine-driven oil pump for improved powertrain efficiency. Its compact, stand-alone design is readily packageable and serviceable. The new device can be used as a part of a new powertrain or to add a friction component to an existing vehicular subsystem that is equipped with neither a pump nor a hydraulic control system.

The actuator is suitable for a wide variety of vehicular and non-vehicular applications that require a hydraulically-operated device. For example, it is suitable for actuating a transfer case friction component in an all-wheel drive powertrain application even if an engine-driven pump and a hydraulic control system are not available. This invention is also well-suited for a use in a gasoline-electric hybrid powertrain that can benefit from as few as one additional gear ratio for improved fuel economy. The modular actuator enables the use of a conventional planetary gear train without requiring an inefficient engine-driven oil pump and a complex hydraulic system for providing additional gear ratios in the hybrid powertrain.

A self-contained actuator system for actuating a friction element includes a hydraulic pump that includes an inlet and an outlet for pumping fluid from the inlet to the outlet in response to expansion and contraction of a pump element produced by a piezoelectric effect in response to a voltage signal having a variable amplitude and frequency. An accumulator includes a cylinder, a piston located in the cylinder, a port located at a first side of the piston and hydraulically connected to the pump outlet and a switching circuit, a spring biasing the piston toward the port, and a pressure relief port connected to a fluid reservoir and located at a second side of the piston. A hydraulically actuated servo includes a front port hydraulically connected to the switching circuit, a back port hydraulically connected to the reservoir, and the servo causing the friction element alternately to engage and to disengage in response to a magnitude of hydraulic pressure in the servo.

Advantages of various embodiments include stand-alone modularity and packageability of the actuator, which can be readily attached to a friction component with a hydraulic servo without requiring an engine-driven oil pump and a conventional hydraulic control system. Efficiency of the actuator is high, partially because the pump can be switched off except during friction component engagement, release, and accumulator pressure maintenance. Pressure applied to a friction element during engagement by the actuator can be controlled accurately due to the use of a piezoelectric diaphragm pump with or without the use of conventional hydraulic pressure regulator valves. The actuator is a self-contained system that is sealed for its entire service life.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
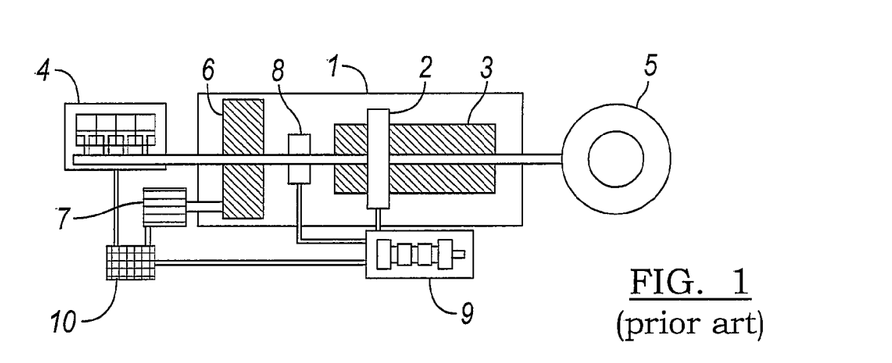
FIG. 1 is a schematic diagram of a vehicular powertrain system.

A conventional step-ratio automatic transmission system 1, as illustrated in FIG. 1, includes wet friction components 2 such as band brakes and plate clutches for automatic shifting among the speed ratios produced by the transmission. Friction components couple, decouple or ground rotating gear elements to alter a torque path within gear sets 3, to achieve a desired level of torque multiplication between an engine 4 and the driven wheels 5. When used as a part of a gasoline-electric hybrid powertrain, the system 1 may include a gear set 6, which couples torque from the engine 4 with torque from an electrical machine 7. A typical friction element 2 is actuated hydraulically, requiring an engine-driven oil pump 8 and a complex hydraulic pressure control system 9, which typically includes a number of pressure and flow control valves. A powertrain control unit 10 controls the engine 4, the hydraulic control system 9 and the electrical motor 7 in a coordinated manner. The engine-driven oil pump 8 draws an appreciable amount of torque from the engine 4, lowering overall powertrain efficiency. Alternatively, friction components 2 can be actuated mechanically or through other means. However, these means tend to be physically large in order to deliver torque capacity comparable to hydraulically-driven systems.

Figure 2:
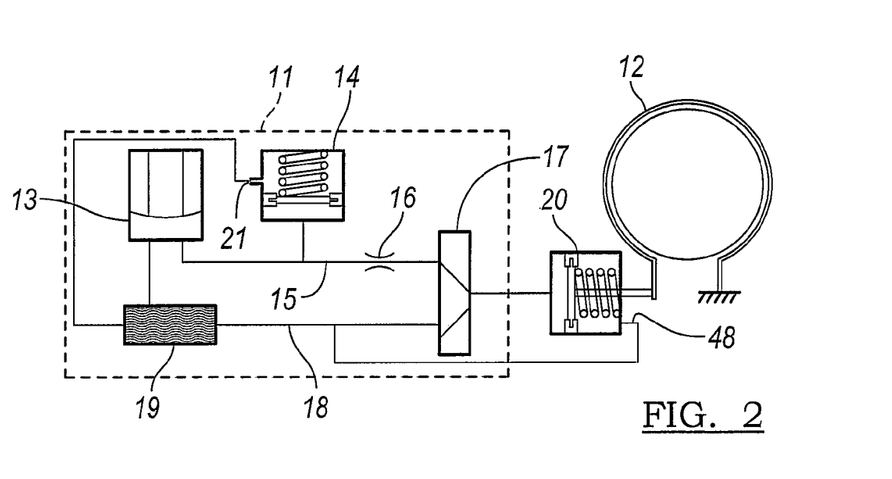
FIG. 2 is a schematic diagram of a self-contained friction component actuator.

Referring now to FIG. 2, the modular friction component actuator 11 is illustrated with a band brake system 12, as an example. The actuator 11 includes a unique arrangement of sub-components, including a piezoelectric diaphragm pump 13, an accumulator 14, an apply line 15, a flow control orifice 16, a switching circuit 17, a return line 18 and an oil reservoir 19. The accumulator 14 may be a piston-type or a bladder-type and may include a pressure relief port 21 or a pressure relief valve. The actuator 11 can be readily attached to a friction component, in this example, a band brake servo 20. The actuator system 11 is commanded through a vehicular powertrain control unit 10, shown in FIG. 1. The actuator 11 strokes and de-strokes the servo 20 in order to engage or release, respectively, the band brake 12, whereby the gear ratios produced by the transmission gear sets 3 are automatically changed. Although the actuator is described for used with a band brake system 12, as readily recognized, the friction component actuator 11 can be used to actuate a hydraulic servo of any other friction component device in a vehicular system, such as a multiple plate clutch.

Figure 3A:
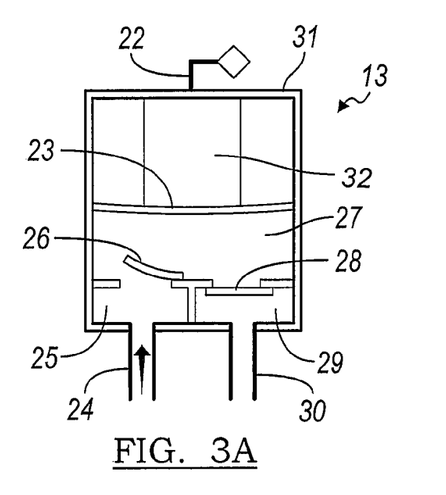
FIGS. 3A and 3B are schematic diagrams of a piezoelectric diaphragm pump for use with the actuator of FIG. 2.
Figure 3B:
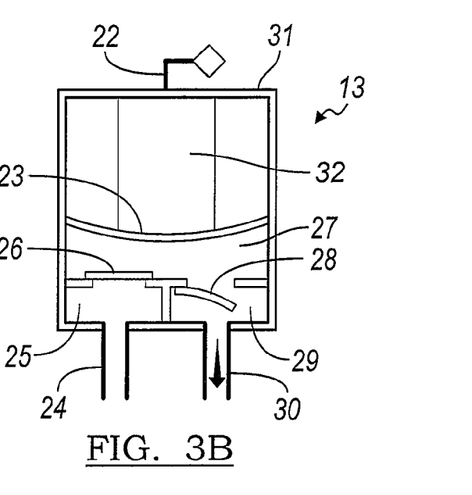

FIG. 3 illustrates an example of a piezoelectric diaphragm pump 13. It consists of a piezoelectric stack 32, an electrode 22, a diaphragm 23, an inlet port 24, an inlet chamber 25, an inlet valve 26, a pumping chamber 27, an outlet valve 28, an outlet chamber 29, an outlet port 30 and an enclosure 31. A one-way flow valve, such as a reed-type valve, may be employed for the inlet valve 26 and the outlet valve 28. The diaphragm 23 may be made of a metallic material and may be preloaded when installed adjacent to the piezoelectric stack 32. The piezoelectric stack 32 is commonly made of a piezoelectric material such as PZT. The electrode 22 connects the piezoelectric stack 32 to a power supply (not shown), which is controlled by a powertrain control unit (not shown). When electrical voltage is applied, the piezoelectric stack 32 either contracts or expands. As illustrated in FIG. 3A, when the stack 32 retracts the diaphragm 23, oil flows into the pumping chamber 27 through the inlet valve 26. As shown in FIG. 3B, when the piezoelectric stack 32 expands and deflects the diaphragm 23, oil flows out from the pumping chamber 27 into the outlet port 30 through the outlet valve 28. Thus, by controlling the voltage level of the power supply and modulating its frequency through the powertrain control unit, the diaphragm motion can be accurately controlled, achieving the desired level of oil flow rate and pressure. The power requirement varies depending on the specification of the piezoelectric stack 32, operating conditions and duty cycles.

The actuator 11 of FIG. 2 consumes electrical energy only during a gear ratio change, called a shift event, which typically lasts for 1 sec. and intermittently thereafter, if required, to make up the effects of oil leakage, if any. Its peak power consumption is expected to be below 100 watts during the short engagement interval. In contrast, an engine-driven oil pump runs constantly in a typical automatic transmission system, continuously consuming from 700 watts (1 hp) to over 2000 watts (3 hp) of engine output, depending on pump capacity and operating conditions. The piezoelectric pump 13 has no rotating elements, unlike a conventional electrical pump, attaining a superior hydraulic response time required for directly controlling pressure applied to a friction component during its engagement. However, the pumping capacity of the piezoelectric pump is generally insufficient by itself for stroking a friction component servo within 0.5 second or less when friction component engagement is commanded.

Figure 4A:
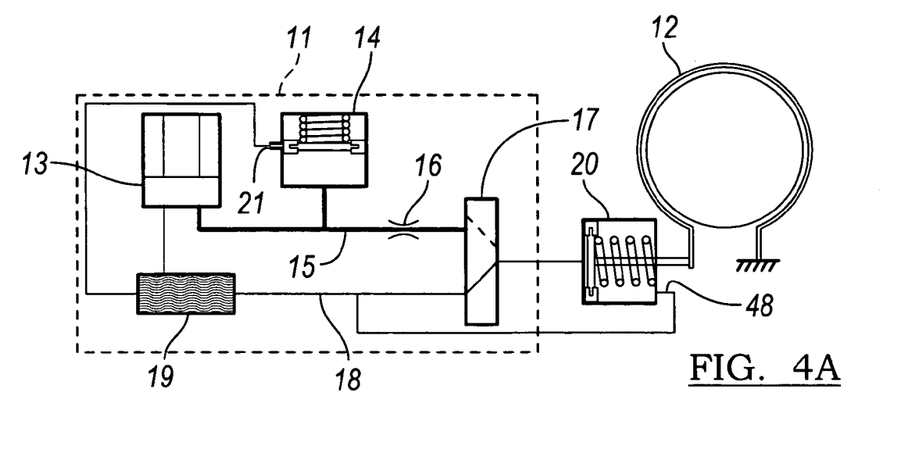
FIG. 4A is a schematic diagram showing the state of the friction component actuator before engagement of the friction component.
Figure 4B:
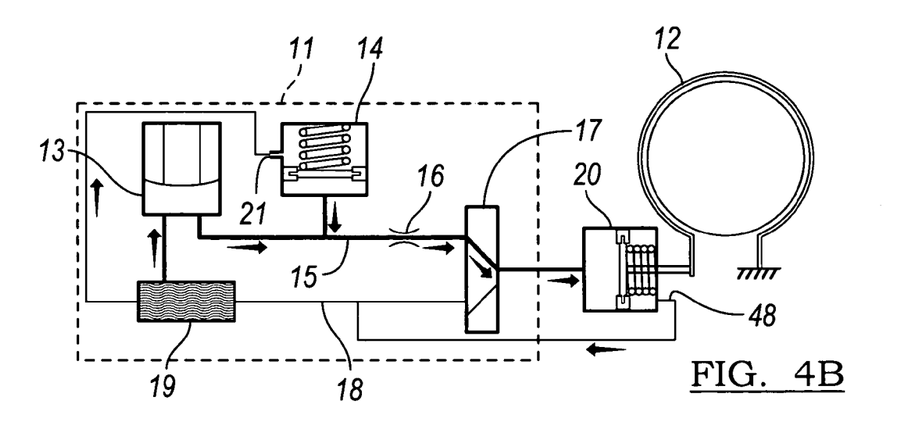
FIG. 4B is a schematic diagram showing oil flow during engagement of the friction component.
Figure 4C:
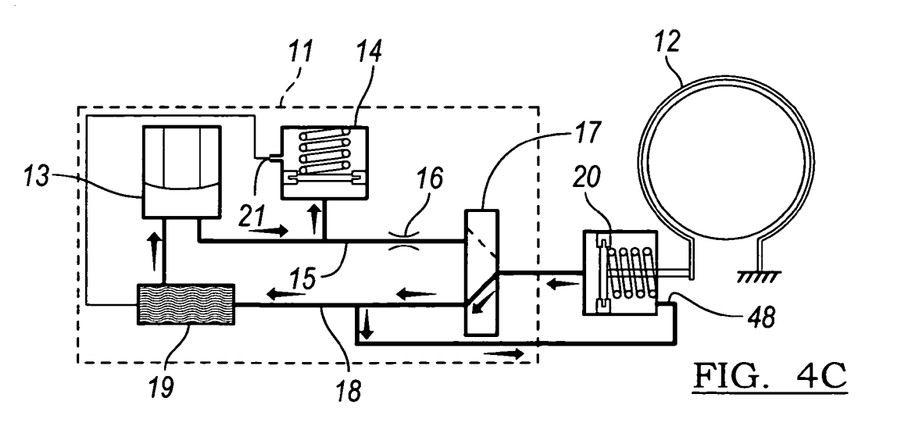
FIG. 4C is a schematic diagram showing oil flow during release of the friction component while independently charging the accumulator.

FIGS. 4A, 4B and 4C illustrate the unique operating principles of the actuator 11 based on the arrangement of sub-systems shown in FIG. 2. The actuator 11 is illustrated with a band brake 12, as an example. FIG. 4A shows the state of the modular device 11 before band brake engagement. The piezoelectric pump 13 remains off with no electrical power consumption. The apply line 15 is fully filled with oil and pressurized. The accumulator 14 is either fully or partly stroked, depending on device applications. The spring rate of the accumulator 14 is designed to maintain the apply line 15 at a pre-specified pressure level prior to engagement. The switching circuit 17 disconnects the apply line 15 from the servo 20. The outlet valve 28 of the pump 13 is closed, isolating the apply line 15. The volume of the accumulator 14 and the apply line 15 is designed to retain the right amount of oil to stroke the servo 20 in a timely manner when the band engagement is commanded.

FIG. 4B shows the oil flow during band engagement. When the engagement is commanded, the switching circuit 17 opens a flow channel from the apply line 15 to the band servo 20. As the accumulator 14 de-strokes, oil flows from the apply line 15 into the servo 20 in a controlled manner through the flow control orifice 16 in order to stroke the servo piston within a desired time interval. At the same time, oil may flow from the back side of the servo 20 into the reservoir 19 through the back port 48 and from the reservoir 19 to the back side of the accumulator 14 though the relief port 21. The flow control orifice 16 may be placed within the switching circuit 17. After a calibrated time delay, the pump 13 is turned on to actively control band servo pressure for smooth band engagement. The electrical voltage and frequency applied to the pump 13 may be controlled either through an open loop process or a closed loop process based on measured or estimated slip speed of the band brake 12. Closed loop feedback signals may be augmented with pressure measurements at the apply line 15 or the servo 20. After completing band engagement, the pump 13 continues to run for a short time until the servo pressure reaches a holding level of the band brake 12. This may be readily accomplished by installing a pressure relief port 21 or a valve as a part of the accumulator 14 and running the pump 13 for a pre-calibrated period. Specifically, as the accumulator 14 is stroked, the relief port 21 opens and returns oil to the reservoir 19 to maintain pressure at the holding level. Alternatively, apply line pressure can be directly monitored and controlled by electrical voltage and frequency applied to the pump 13. After the servo pressure reaches the holding level, the pump 13 is shut off, no longer consuming any electrical power. The outlet valve 28 of the pump 13 is closed, maintaining the constant apply line pressure and servo pressure. Alternately, a three-way valve may be employed in the switching circuit 17 in order to disconnect the servo 20 from both the apply line 15 and the return line 18 at the same time and to maintain the servo pressure. A back port 48 may be attached to the servo 20 and connected to the return line 18, capturing leakage flow, if required, across the servo piston back to the reservoir 19. The reservoir 19 may be equipped with a fill-level sensor and a refill port for an improved serviceability in the case of an unexpected loss of oil.

FIG. 4C illustrates the oil flow during band release. When the release of the band brake 12 is commanded, the switching circuit 17 opens a flow channel from the servo 20 to the return line 18, which feeds into the oil reservoir 19. Some oil may flow into the back side of the servo 20 through the back port 48. The apply line 15 and the accumulator 14 remain pressurized at the friction component holding level during and after the release event. This enables the actuator 11 to respond to the next engagement command without any delay. Although it is not necessary, the pump 13 can be turned on during the release to ensure that the apply line 15 and the accumulator 14 remain pressurized at a desired level. In this case, the pump control may be based on an open loop process with pre-calibrated control parameters for a fixed duration. The accumulator 14 may include a pressure relief port or valve 21 to accurately limit the charge pressure at a pre-calibrated level. The relief port 21 may also be used to purge trapped air to prevent air accumulation. The pump control may be based on a closed loop process based on measurements of apply line pressure to achieve a desired pressure level. After running the pump 13 for a pre-calibrated period through an open loop process or after the apply line pressure reaches a desired level by means of a closed loop control, the pump 13 can be shut off until the next engagement event is commanded.

Figure 5A:
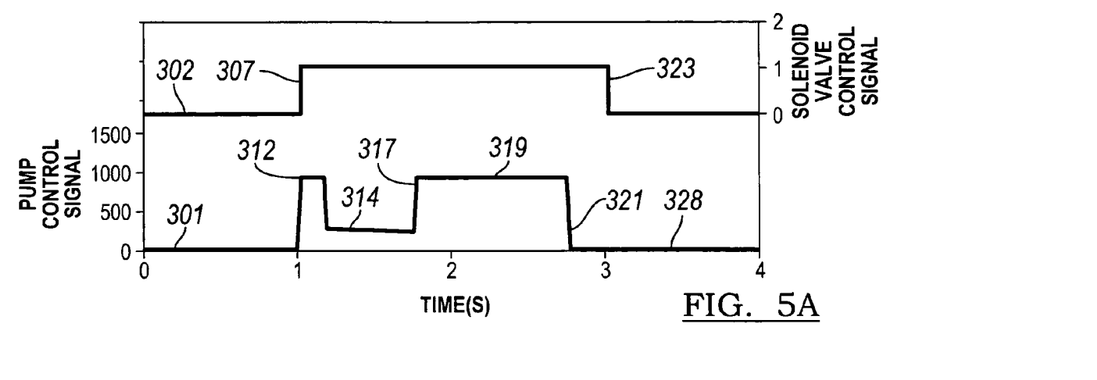
FIGS. 5A, 5B and 5C illustrate examples of a control sequence, hydraulic response and mechanical response, respectively, of the friction component actuator shown in the embodiment of FIGS. 4A, 4B and 4C.
Figure 5B:
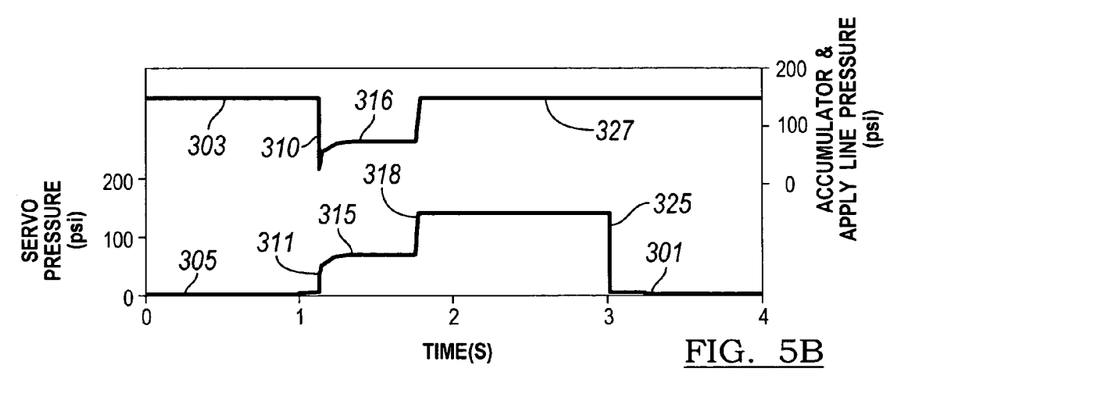
Figure 5C:
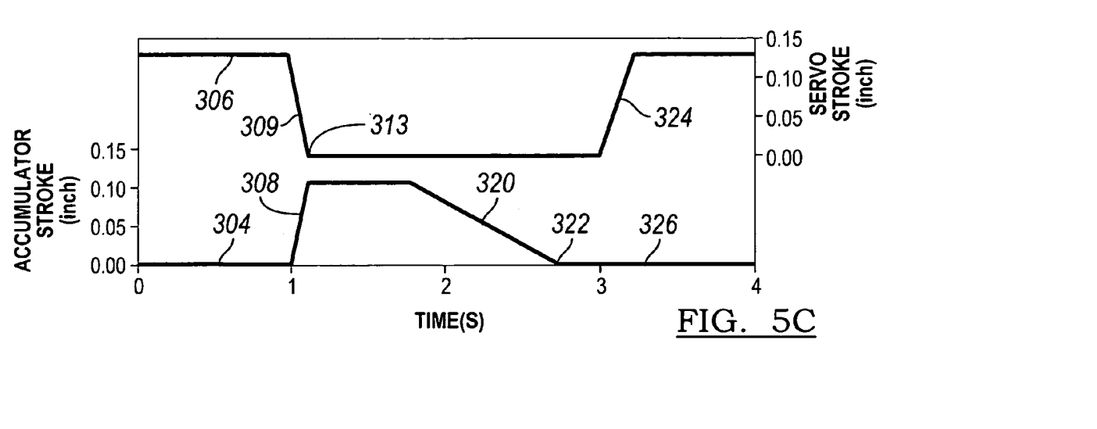
Figure 6:
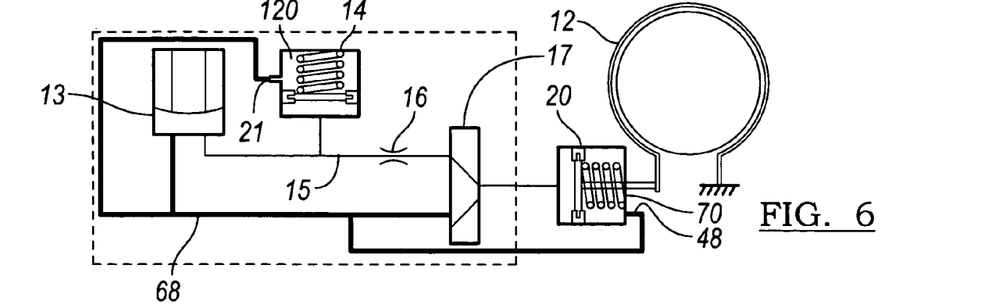
FIG. 6 shows an alternative embodiment in which the back side of the accumulator and the back side of the actuator are used as reservoirs.

FIGS. 5A, 5B and 5C show the operating behavior of the actuator 11. Specifically, an example of a control sequence, hydraulic response and mechanical response are presented in FIGS. 5A, 5B and 5C, respectively, with reference to the embodiment of FIG. 4. In FIG. 5A, the pump control signal indirectly represents a level of electrical voltage and frequency. In the same figure, the solenoid valve control signal indirectly reflects a level of electrical current. Before an engagement event, the pump power is off 301 with no input signal, thereby consuming no electrical power. The solenoid valve in the switching circuit is also turned off 302. The accumulator 14 and the apply line 15 remain pressurized at a holding level of 150 psi 303. The accumulator 14 is fully stroked, indicated at the zero position 304. The servo pressure is zero 305 and its piston stays de-stroked as indicated at 0.13 inch position 306.

When engagement of the brake band or another friction element 12 is commanded, the solenoid valve is turned on 307, opening the flow switching circuit 17. As the accumulator 14 de-strokes 308, oil flows into the servo 20 for stroking 309. The accumulator 14 and apply line 15 pressure drops 310 as the servo pressure increases 311. The pump 13 is turned on 312 in order to replenish the apply line 15 with oil. Once the piston of servo 20 is stroked 313, the pump control signal is adjusted 314 based on a conventional automatic transmission shift control methodology to achieve a desired servo pressure profile 315 for smooth gear ratio shifting. Note that the servo pressure 315 and the apply line pressure 316 stay the same during the engagement.

After completing the engagement, the pump control signal is increased 317 to raise the servo pressure 318 to a holding level of 150 psi. The pump continues to run 319 for about 1 sec to stroke the accumulator piston 320 in order to prepare for the next engagement. The pump powered is off 321 after the piston of accumulator 14 is stroked to a desired position 322. When the release event is commanded, the solenoid valve is turned off 323 to open the flow path from the servo 20 to the release line 18. The servo de-strokes 324 and its pressure quickly drops 325. Note that the accumulator 14 remains stroked 326 and its pressure stays unchanged 327. The pump remains powered off 328 until the next engagement is commanded.

FIGS. 6-9 show alternative embodiments of the invention. In the FIG. 6 embodiment, the release line 68, the back side 120 of the accumulator 14, and the back side 70 of the band servo 20 are designed to hold enough oil to function as an oil reservoir. This embodiment offers packaging flexibility depending on the application of the invented device.

Figure 7:
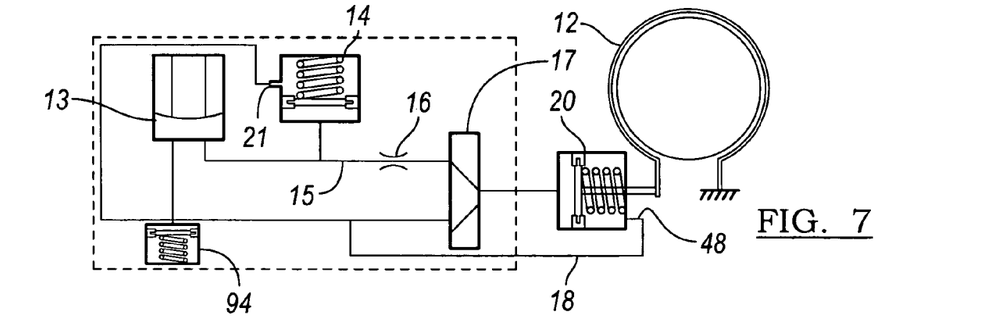
FIG. 7 shows an alternative embodiment that in which a low rate accumulator is a reservoir.

In FIG. 7, an accumulator 94 having a low spring rate replaces oil reservoir 19. This feature excludes trapped air and reduces the effects of cavitation during pumping operation. A bladder-type accumulator may be employed instead of the piston-type illustrated in FIG. 7.

Figure 8:
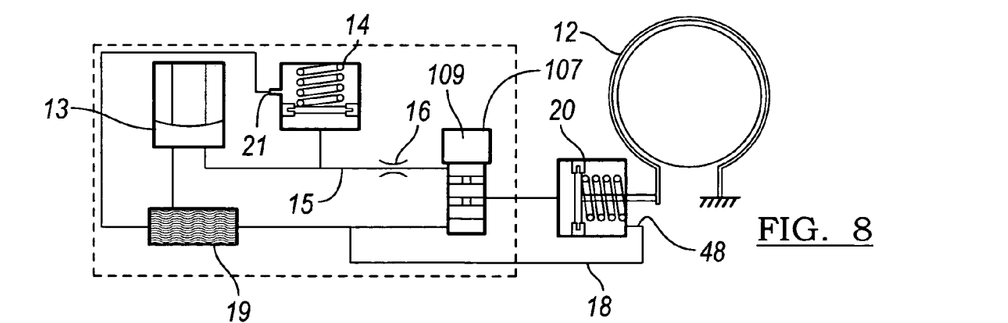
FIG. 8 shows an alternative embodiment that includes a switching circuit having a pressure regulator valve.

In FIG. 8, switching circuit 17 is replaced by a flow control circuit 107 that includes a pressure regulator valve 109. The circuit 107 complements the pump 13 to adjust oil flow and pressure applied to the servo 20 through closed loop control based on measured or estimated slip speed during engagement. In the FIG. 8 embodiment, a flow control orifice 16 may not be required.

Figure 9:
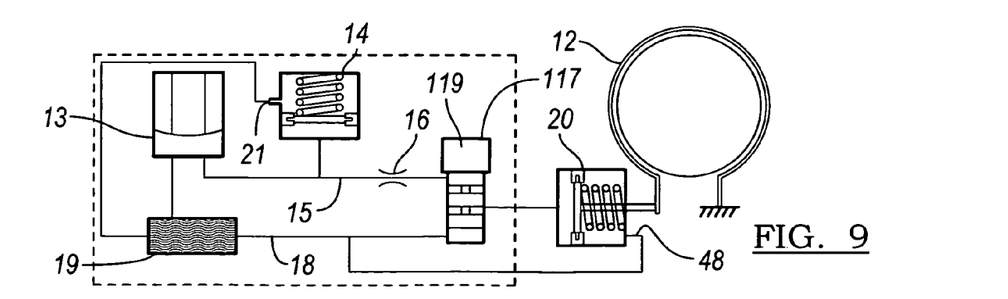
FIG. 9 shows an alternative embodiment that includes a switching circuit having a pulse-width modulated (PWM) valve.

FIG. 9 shows the alternative embodiment that employs a flow control circuit 117 having a pulse-width modulated (PWM) valve 119. The circuit 117 complements the pump 13 to adjust flow and pressure applied to the servo 20 based on slip speed measurements similarly to the embodiment of FIG. 8.

Figure 10A:
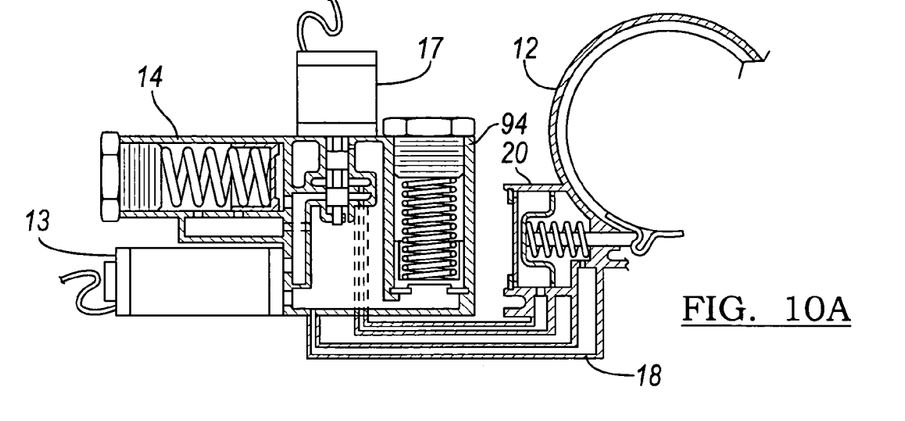
FIGS. 10A, 10B and 10C are partial cross sections showing packaging examples of the actuator for a band brake application.
Figure 10B:
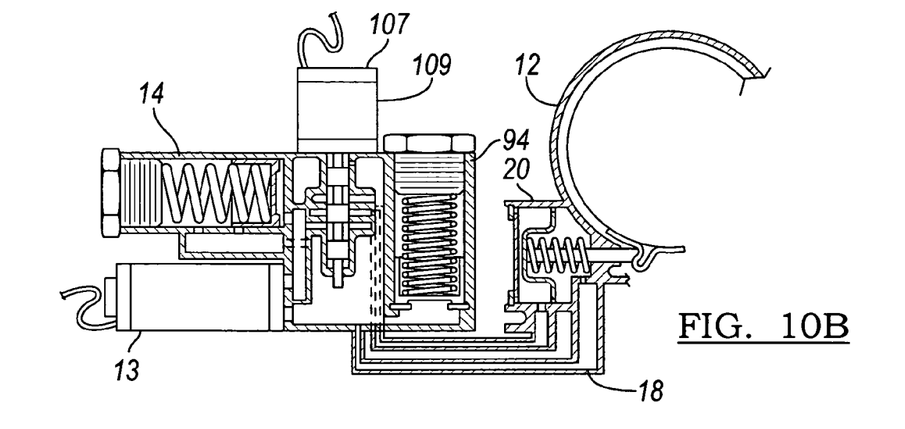
Figure 10C:
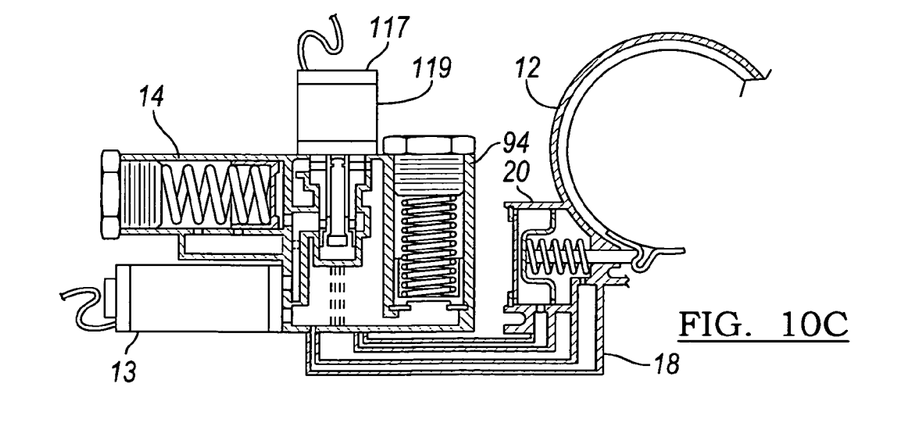

FIGS. 10A, 10B and 10C show packaging examples of the actuator 11 for a band brake application. The embodiment of FIG. 10A corresponds to the embodiment shown in FIG. 7. Key components include a piezoelectric diaphragm pump 13, an accumulator 14, a low rate accumulator 94, which functions as a fluid reservoir, and a switching circuit 17 having an on-off solenoid valve.

The embodiment illustrated in FIG. 10B corresponds to the embodiment shown in FIG. 8. It includes a switching circuit 107 having a pressure regulator valve 109, and a low rate accumulator 94, which functions as a reservoir.

The embodiment illustrated in FIG. 10C, corresponds to the embodiment shown in FIG. 9. It includes a switching circuit 117 having a PWM valve 119, and a low rate accumulator 94, which functions as a reservoir.

The embodiments comprise a unique architecture of sub-systems, primarily including a piezoelectric pumping device, an accumulator, a pressure relief port, a control orifice, a switching circuit, and a reservoir, which enable use as a modular friction component actuator based on unique operating principles. While embodiments of the invention have been illustrated and described, it is not intended that these embodiments illustrate and describe all possible forms of the invention. Rather, words used in this disclosure are words of description rather than limitation. It is understood that various changes, including a design of sub-components such as a piezoelectric pump, may be made without departing from the spirit and scope of the invention. It is also understood that the applicability of the invention is not limited to automotive friction components, but includes any other vehicular and non-vehicular applications that include a hydraulically-driven servo.

In accordance with the provisions of the patent statutes, the preferred embodiment has been described. However, it should be noted that the alternate embodiments can be practiced otherwise than as specifically illustrated and described.

What is claimed is:

1. An actuator system comprising:
   a friction element;
   a pump including an inlet, an outlet and a pump element operative by a piezoelectric effect in response to a voltage signal having a variable amplitude and frequency;
   a switching circuit;
   a reservoir;
   a first accumulator including a piston biased toward a first accumulator port that communicates a first piston side to the pump outlet and the switching circuit, and a pressure relief port communicating the reservoir to a second piston side; and
   a servo including a front port connected to the switching circuit, a back port connected to the reservoir, the servo engaging and disengaging the friction element in response to servo pressure.

2. The system of claim 1 wherein the pump further comprises:
   an enclosure surrounding a chamber;
   a piezoelectric stack positioned inside the enclosure;
   the pump element is a diaphragm located in the enclosure, positioned adjacent to the stack within a first chamber containing the stack, defining a pumping chamber within the enclosure, the diaphragm alternately compressing and expanding the pumping chamber in response to expansion and contraction of the stack, respectively;
   an electrode electrically coupled to the stack;
   the inlet communicates with the pumping chamber;
   an inlet valve opening and closing communication between the inlet and the pumping chamber in response to differential pressure across the inlet valve;
   the outlet communicates with the pumping chamber; and
   an outlet valve opening and closing communication between the outlet and the pumping chamber in response to differential pressure across the outlet valve.

3. The system of claim 2 wherein the pump further comprises:
   an inlet chamber continually communicating with the inlet port and communicating with the pumping chamber through the inlet valve; and
   an outlet chamber continually communicating with the outlet port and communicating with the pumping chamber through the outlet valve.

4. The system of claim 1 further comprising:
   a flow control orifice for controlling the flow rate of fluid from the first accumulator port of the first accumulator to the front port of the servo.

5. The system of claim 1 further comprising:
   a pressure relief valve to limit a magnitude of a pressure in the first accumulator and to maintain a magnitude of pressure in the servo following engagement of the friction element.

6. The system of claim 1 further comprising:
   a pressure relief valve hydraulically connected to the pressure relief port of the first accumulator, for relieving pressure in the first accumulator; and
   the reservoir is hydraulically connected to the pressure relief valve and the pump inlet for holding fluid and releasing fluid to the pump inlet.

7. The system of claim 1 wherein the switching circuit is hydraulically connected to the front port of the servo, the first accumulator port of the first accumulator, and the pump outlet, for opening communication between said first accumulator port and the front servo port while closing communication between the front servo port and a return line, and alternately closing communication between said first accumulator port and front servo port while opening communication between the front servo port and the return line.

8. An actuator system, comprising:
   a friction element;
   a pump including an inlet, an outlet and a pump element operative by a piezoelectric effect in response to a voltage signal having a variable amplitude and frequency;
   a switching circuit;
   a servo including a front port connected alternately to the pump outlet by the switching circuit, the servo engaging and disengaging the friction element in response to servo pressure;
   a first accumulator containing a piston biased toward, a first accumulator port communicating a first piston side to the pump outlet and the switching circuit, and a pressure relief port communicating a second piston side to
   a second accumulator that includes a second accumulator port connected to the pump inlet, and a second piston biased toward the second accumulator port, for holding therein and releasing pressurized fluid to the pump inlet.

9. The system of claim 8 wherein:
   the second accumulator is hydraulically connected to a fluid return line, a back port of the servo, and the pump inlet, the second accumulator including a second cylinder, a second piston located in the second cylinder, a second accumulator port communicating with the second cylinder and the second piston, and a second spring urging the second piston toward the second accumulator port, the second accumulator holding and releasing hydraulic fluid in response to a magnitude of pressure at the second accumulator port.

10. The system of claim 9 wherein the second accumulator has a spring rate that is less than a spring rate of the first accumulator.

11. The system of claim 8, wherein:
   the first accumulator further comprises a cylinder, the first piston is located in the cylinder, the first accumulator port located at a first side of the first piston is hydraulically connected to the pump outlet and the switching circuit, a spring biasing the first piston toward the first accumulator port, and the pressure relief port located at the second side of the first piston is hydraulically connected to the second accumulator port.

12. The system of claim 8 wherein the pump further comprises:
   an enclosure surrounding a chamber;
   a piezoelectric stack inside the enclosure;
   the pump element is a flexible diaphragm located in the enclosure, positioned adjacent to the stack within a first chamber, and defining a pumping chamber within the enclosure, the diaphragm alternately compressing and expanding a volume of the pumping chamber in response to expansion and contraction of the stack, respectively;
   an electrode electrically coupled to the stack;
   the inlet communicates with the pumping chamber;
   an inlet valve opening and closing communication between the inlet and the pumping chamber in response to differential pressure across the inlet valve;
   the outlet communicates with the pumping chamber; and
   an outlet valve opening and closing communication between the outlet and the pumping chamber in response to differential pressure across the outlet valve.

13. The system of claim 12 wherein the pump further comprises:
   an inlet chamber continually communicating with the inlet port and communicating with the pumping chamber through the inlet valve; and
   an outlet chamber continually communicating with the outlet port and communicating with the pumping chamber through the outlet valve.

14. The system of claim 8 wherein:
   the first accumulator further comprises a cylinder, the first piston is located in the cylinder, the first accumulator port located at a first side of the first piston is hydraulically connected to the pump outlet and the switching circuit, the pressure relief port located at a second side of the first piston is hydraulically connected to the second accumulator, and a spring biasing the first piston toward the first accumulator port; and
   a flow control orifice for controlling the flow rate of fluid from the port of the first accumulator to the front servo port.

15. The system of claim 8, wherein:
   the first accumulator further comprises a cylinder, the first piston is located in the cylinder, the first accumulator port located at a first side of the first piston is hydraulically connected to the pump outlet and the switching circuit, the pressure relief port located at the second side of the first piston is hydraulically connected to the second accumulator, and a spring biasing the first piston toward the first accumulator port; and
   a pressure relief valve to limit a magnitude of a pressure in the first accumulator and to maintain a magnitude of pressure in the servo following engagement of the friction element.

16. The system of claim 8 wherein the second accumulator has a spring rate that is less than a spring rate of the first accumulator.

17. The system of claim 8, wherein:
   the first accumulator further comprises a cylinder, the first piston is located in the cylinder, the first accumulator port located at a first side of the first piston is hydraulically connected to the pump outlet and the switching circuit, the pressure relief port located at the second side of the first piston is hydraulically connected to the second accumulator, and a spring biasing the first piston toward the first accumulator port;
   a pressure relief valve hydraulically connected to the pressure relief port of the first accumulator, for relieving pressure in the first accumulator; and
   the second accumulator hydraulically connected to the pressure relief valve and the pump inlet for holding fluid and releasing fluid to the pump inlet.

18. The system of claim 8 further comprising:
   a return line; and
   the first accumulator further comprises a cylinder, the first piston is located in the cylinder, the first accumulator port located at a first side of the first piston is hydraulically connected to the pump outlet and the switching circuit, the pressure relief port located at the second side of the first piston is hydraulically connected to the second accumulator, and a spring biasing the first piston toward the first accumulator port; and
   wherein the switching circuit is hydraulically connected to the front port of the servo, the first accumulator port, and the pump outlet, for opening communication between said first accumulator port and front servo port while closing communication between the front servo port and the return line, and alternately closing communication between said first accumulator port and front servo port while opening communication between the front servo port and the return line.

19. An actuator system comprising:
   a friction element;
   a pump including an inlet, an outlet and a pump element operative by a piezoelectric effect in response to a voltage signal having a variable amplitude and frequency;
   a switching circuit;
   a first accumulator including a first piston biased toward a first accumulator port that communicates a first piston side to the pump outlet and the switching circuit, and a pressure relief port communicating to a second piston side;
   a second accumulator including a second accumulator port connected to the pump inlet, and a second piston biased toward the second accumulator port, for holding therein and releasing pressurized fluid to the pump inlet,
   a servo including a front port connected to the switching circuit, a back port connected to the second accumulator, the servo engaging and disengaging the friction element in response to servo pressure.

20. The system of claim 19, wherein:
   the second accumulator is hydraulically connected to a fluid return line, a back port of the servo, and the pump inlet.

21. The system of claim 9, further comprising:
   a first spring biasing the first piston;
   a second spring biasing the second piston, wherein a spring rate of the second spring is less than a spring rate of the first spring.

* * * * *